United States Patent
Moody

(10) Patent No.: US 7,514,664 B2
(45) Date of Patent: Apr. 7, 2009

(54) NIGHT-VISION SYSTEM INCLUDING FIELD REPLACEABLE IMAGE INTENSIFIER TUBE

(75) Inventor: Scott D. Moody, Manchester, NH (US)

(73) Assignee: Insight Technology Incorporated, Londonderry, NH (US)

(*) Notice: Subject to any disclaimer, the term of this patent is extended or adjusted under 35 U.S.C. 154(b) by 187 days.

(21) Appl. No.: 11/336,696

(22) Filed: Jan. 20, 2006

(65) Prior Publication Data

US 2008/0290260 A1 Nov. 27, 2008

Related U.S. Application Data

(63) Continuation-in-part of application No. 10/449,734, filed on May 30, 2003, now Pat. No. 7,294,820.

(60) Provisional application No. 60/645,094, filed on Jan. 20, 2006.

(51) Int. Cl.
*H01J 31/50* (2006.01)
*H01J 40/14* (2006.01)
*G02B 23/00* (2006.01)

(52) U.S. Cl. .......................... 250/214 VT; 250/207; 359/407

(58) Field of Classification Search ................ 250/207, 250/214 VT; 359/399, 407, 409
See application file for complete search history.

(56) References Cited

U.S. PATENT DOCUMENTS

| | | | |
|---|---|---|---|
| 4,440,476 A | * | 4/1984 | Jacobson ................ 313/524 |
| 5,365,057 A | | 11/1994 | Morley et al. |
| 5,644,425 A | | 7/1997 | Palmer |
| 5,737,131 A | | 4/1998 | Palmer |
| 5,867,313 A | | 2/1999 | Schweitzer et al. |
| 5,902,996 A | | 5/1999 | Sauter |
| 6,075,644 A | | 6/2000 | Filipovich |
| 6,201,641 B1 | | 3/2001 | Filipovich |
| 6,326,604 B1 | | 12/2001 | Collins |
| 6,462,894 B1 | | 10/2002 | Moody |
| 6,469,828 B2 | | 10/2002 | Plotsker |
| 6,493,137 B1 | | 12/2002 | Solinsky et al. |
| 6,687,053 B1 | | 2/2004 | Holmes et al. |

* cited by examiner

*Primary Examiner*—Thanh X Luu

(57) ABSTRACT

A night vision system has an image intensifier tube that may be installed or replaced without requiring realignment of the optics. A first locating feature may be coupled to the image intensifier tube to align the first locating feature with an input optical axis of the image intensifier tube. A second locating feature may be coupled to the image intensifier tube to align the second locating feature with the output optical center of the image intensifier tube and form an image at a predetermined location along the output optical axis.

10 Claims, 5 Drawing Sheets

NIGHT-VISION SYSTEM INCLUDING FIELD REPLACEABLE IMAGE INTENSIFIER TUBE

CROSS-REFERENCE TO RELATE APPLICATIONS

This application is a continuation-in-part of and claims priority to U.S. patent application Ser. No. 10/449,734 filed May 30, 2003 now U.S. Pat. No. 7,294,820, and U.S. Provisional Patent Application Ser. No. 60/645,094 filed Jan. 20, 2006, both of which are hereby incorporated by reference in their entirety.

FIELD OF THE INVENTION

The present invention relates to night vision systems, and in particular to a night vision system having a replaceable image intensifier tube that does not require optical realignment of the system after installation of the tube.

BACKGROUND

Night vision systems include image intensification, thermal imaging, and fusion monoculars, binoculars, and goggles, whether hand-held, weapon mounted, or helmet mounted. Night vision systems are typically equipped with one or more image intensifier tubes to allow an operator to see visible wavelengths of radiation (approximately 400 nm to approximately 900 nm).

In conventional panoramic night vision systems, two separate monocular subassemblies are provided. Each monocular subassembly includes two image channels. Each of the image channels may be provided by an objective assembly that transmits an image from a viewed object to an image intensifier tube that intensifies the luminance of the image, and outputs the intensified image to another optical assembly, such as an eyepiece.

The panoramic effect of such a night vision system is achieved by angling the optical axes of each of the two image channels of each monocular relative to one another, but having partially overlapping fields of view. The separate image channels must be combined, such as with the image combiner. If the optical axes of the separate image channels are not properly aligned, the image may be sheared.

Unfortunately, the location of the input and output optical axes of an image intensifier tube may vary from tube to tube. The variation in the location of the optical axes of image intensifier tubes must be accommodated during the manufacture or assembly of a panoramic night vision system in order to assure the proper alignment of the optical axis of each channel in a monocular. Conventionally, during manufacture of the night vision system the optical axis of the image intensifier tube is properly aligned with the optical axis of the assembly and the image intensifier tube is secured in place in the optical assembly to prevent shifting of the image intensifier tube. Securing the image intensifier tube in the optical assembly may include bonding the image intensifier tube to an adjacent component of the assembly, clamping the image intensifier tube in an axial manner using a retaining ring, etc.

While the above techniques may be able to overcome the problem of initial alignment of the image intensifier tube in the night vision system, optical tolerances are too high to allow replacement or removal of the image intensifier tube without realigning and re-securing image intensifier tube.

Alignment of an optical axis of an image intensifier tube with an optical axis of an optical assembly may also be desirable for single tube, monocular and binocular night vision systems or weapon-mounted scopes.

Fusion night vision systems have been developed that combine image intensification with thermal (infrared) imaging. Thermal sensors allow an operator to see people and objects because they emit thermal energy. The image intensification information and the infrared information are fused together to provide a combined image that provides benefits over just image intensification or just thermal imaging. Whereas typical night vision systems with image intensification can only see visible wavelengths of radiation, a fused night vision system provides additional information by providing heat information to the operator. The image intensification image and the thermal image may be optically or electronically fused together. Proper registration of the two images in an eyepiece improves system performance.

BRIEF DESCRIPTION OF THE DRAWINGS

Various features and aspects of the present invention are set forth herein by description of exemplary embodiments consistent with the invention, which description should be understood in conjunction with the accompanying drawings, wherein.

DETAILED DESCRIPTION

For simplicity and ease of explanation, the present invention will be described herein in connection with various exemplary embodiments thereof. Those skilled in the art will recognize, however, that the features and advantages of the present invention may be implemented in a variety of configurations. It is to be understood, therefore, that the embodiments described herein are presented by way of illustration, not of limitation.

Figure 1:
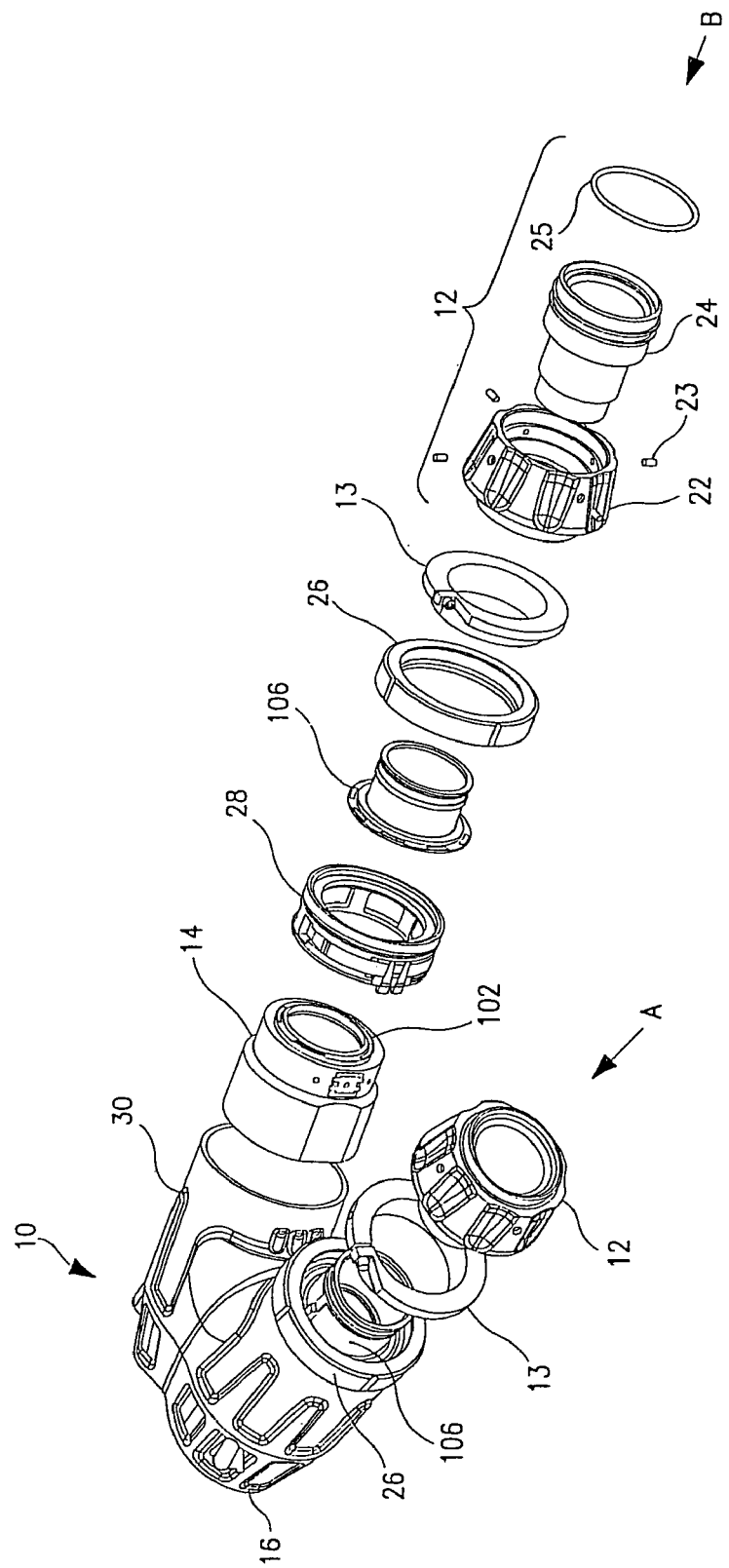
FIG. 1 depicts an exploded view of a monocular including an image intensifier tube consistent one embodiment of the present invention.

FIG. 1 illustrates an exploded view assembly of an exemplary monocular 10, such as may be used in a panoramic night vision system consistent with one embodiment of the invention. The illustrated monocular 10 includes two channels having respective optical axes A and B. Each channel may have a generally comparable assembly generally including an objective assembly 12, a field replaceable image intensifier tube 14, and an eyepiece 16.

Referring especially to the channel associated the optical axis B, the assembly is further broken down to illustrate exemplary subassembly and components that may be provided with each channel. In the illustrated embodiment, the objective assembly 12 may further include an o-ring 25 that seals the objective lens assembly 24 in the focus aligned focus collar 22. A number of setscrews 23 may also be used to secure the objective lens assembly 24 to the focus collar 22. A focus stop ring 13 may be disposed at the proximal end of the objective assembly 12.

The distal end of the image intensifier tube 14 may be coupled to an image intensifier contact assembly 28. The contact assembly 28 may include a plurality of leaf springs that allow for at least a small degree of radial displacement of the image intensifier tube 14 relative to the contact housing 28. An image intensifier tube retaining ring 26 may be provided for retaining the image intensifier tube 14 and contact housing 28 in the monocular housing 30.

The image intensifier tube 14 and contact assembly 28 may be disposed in the monocular housing 30 and the objective assembly 12 may be secured to the housing 30. The housing 30 may include a hot shoe electrical contact (not shown), which provides power to the monocular 10, and an image intensifier tube gain adjustment (also not shown). The proximal end of the monocular 10 includes the eyepiece assembly 16, which typically houses additional optical components for combining the images provided by each of the optical channels. The monocular assembly described herein is merely an exemplary assembly, and it should be understood that the assembly and/or components may be varied without impacting the invention herein.

Figure 2:
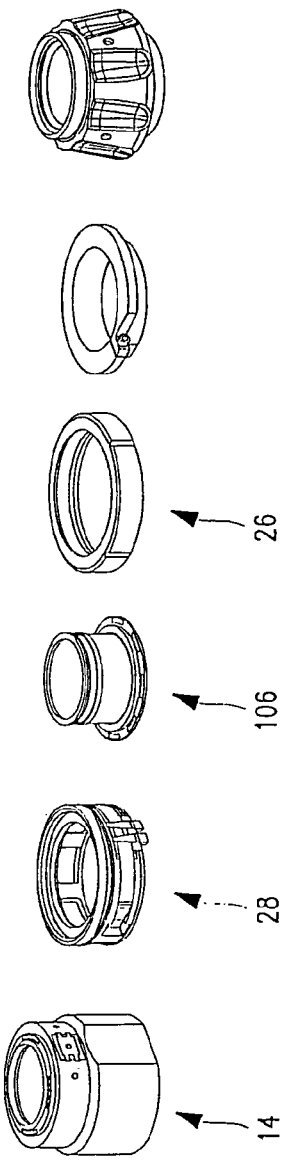
FIG. 2 is an enlarged view of an exemplary image intensifier tube illustrated in FIG. 1.
Figure 2:
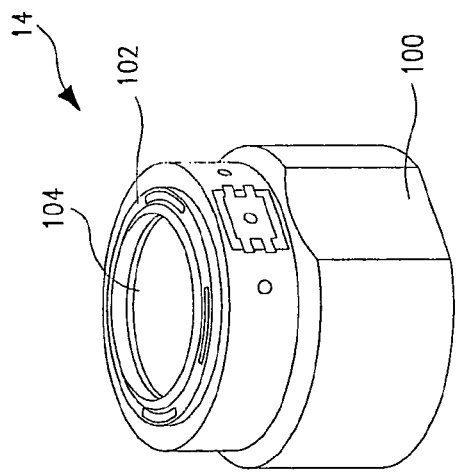

Turning to FIG. 2, an enlarged view of the exemplary image intensifier tube 14 is shown generally including a housing 100 that protects and contains the image intensifier element. The exemplary image intensifier tube 14 includes a first locating feature provided as a ring 102 attached to one face 104 of the image intensifier tube 14. In an exemplary embodiment, the ring 102 may be aligned concentrically with the optical center of the image intensifier tube 14. The ring 102 may be a metal, plastic, ceramic, etc. component that is attached to the face 104 using an adhesive, such an epoxy, or using numerous other techniques that will be apparent to those having skill in the art.

Figure 3:
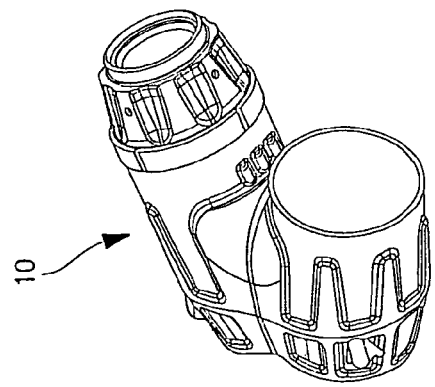
FIG. 3 illustrates exemplary components of the image intensifier and objective assembly of FIG. 1.

The ring 102 is configured to interact with a second locating feature 106 to place the optical center of the image intensifier tube 14 in alignment with an optical component of the monocular 10, such as the objective assembly 12 or the eyepiece assembly 16, etc. Referring to FIGS. 1 and 3, the ring 102 may interact with the corresponding second locating feature 106 that may be attached to the objective assembly 12, such as by being screwed onto the proximal end of the objective lens assembly 24, as shown in FIG. 1. The second locating feature 106 associated with the objective assembly 12 may be formed having an inside diameter that is sized to at least partially receive the outside diameter of the ring 102. The fit between the ring 102 and the second locating feature 106 is close enough to provide controlled alignment between the first locating feature, i.e. the ring 102, and the second locating feature 106. The controlled alignment between the ring 102 and the second locating feature 106 in turn provides controlled positioning of the optical center of the image intensifier 14 relative to the objective assembly 12.

In the described exemplary embodiment, the first locating feature is directly coupled to the image intensifier tube, i.e., the ring 102 is bonded to a face 104 of the image intensifier. However, the first locating feature may be indirectly coupled to the image intensifier. That is, the first locating feature may be coupled to a subsidiary component, such as the protective housing 100 or an even further removed component. It is only necessary that the first locating feature be in alignment with the optical center of the image intensifier in order to allow subsequent alignment of the optical center relative to an optical component of the night vision system.

In the illustrated exemplary embodiment of FIGS. 1 through 3, the first locating feature and the second locating feature act to directly align the image intensifier with an optical component of the night vision system, i.e., with the objective assembly. Additional and alternative direct and indirect associations between the first locating feature, the second locating feature and an optical component of the system may also be suitable. Other exemplary direct associations may include providing a second locating feature directly on an optical component, such as a lens of the objective assembly adjacent the image intensifier. For example, a first locating ring feature may mate with a second locating ring feature that is bonded to a proximal lens of the objective assembly.

Indirect association between the second locating feature and an optical component may also be suitable. For example, the second locating feature may be part of the image intensifier contact assembly 28, which assembly may be aligned with the objective assembly. Additional means for indirectly coupling the first locating feature to the image intensifier may include coupling the first locating feature to the image intensifier through components that are adjacent and/or interact with the image intensifier. Similarly, the second locating feature also does not have to be directly connected to an optical component of the system.

The above reference to the objective lens or objective assembly as the optical component with which the second locating feature is associated is made only for the purpose of illustration. The first and second locating features may also/alternatively be used to specifically place the optical center of the image intensifier in alignment with the eyepiece, or any other desired optical component of the night vision system.

Consistent with the exemplary embodiment, the first locating feature may be an upstanding member that may be attached to a marginal region of a face of the image intensifier, such as the ring of the exemplary embodiment, although numerous alternative geometries may also be suitable. For example, the first locating feature may be a square, hexagonal, keyed, etc. ring that may be attached to a peripheral region of an image intensifier face so that the light reception of the image intensifier is not compromised. The second locating feature may include a protrusion, such as a ring, configured to be at least partially received within or at least partially surround the first locating feature. Numerous alternative features may also be used that will interact with the first locating feature to establish a predetermined orientation or position of the first locating feature, and therein the image intensifier.

In addition to the ring described above and with reference to the exemplary embodiment, the first and second locating features may also include a variety of mechanical elements that interact to provide the desired alignment of the features, and ultimately the desired alignment of the image intensifier. For example, the features may include coordinating protrusions and indentations in associated components. Numerous other mechanical features will be understood by those having skill in the art. Furthermore, it may be advantageous, although not necessary, to provide at least one of the first locating feature and the second locating feature with a chamfer, angled portion, etc. that facilitates assembly, engagement or interaction of the two locating features in a manner that produces the desired alignment of the optical center of the image intensifier.

Installation or replacement of the image intensifier is simplified with the system consistent with one embodiment of the present invention by eliminating the need to realign the optics following the installation. Referring to the illustrated embodiment of FIGS. 1 through 3, replacement of the image intensifier 14 first requires separating the objective assembly 12 from the housing 30. Once the objective assembly 12 has been removed, the image intensifier tube retaining ring 26 and the image intensifier tube 14 and contact assembly 28 may be extracted from the monocular housing 30. Thereafter, the image intensifier contact assembly 28 may be separated from the image intensifier tube 14.

The monocular 10, or more specifically the monocular subassembly corresponding to one of the optical channels, may be reassembled with a new image intensifier tube in generally the reverse order of disassembly. An image intensifier tube, corresponding in structure to the removed image intensifier tube 14, having a first locating feature 102 may be assembled to the image intensifier contact assembly 28. This may occur by inserting the distal end of the image intensifier tube 14 having the first locating feature thereon into the contact assembly 28. The contact assembly 28 stabilizes the image intensifier 14 while still allowing some radial displacement for the image intensifier 14. The assembled image intensifier 14 and contact assembly may be inserted into the monocular housing 30. With the image intensifier tube retaining ring 26 in place over the contact housing 28, the objective assembly 12 including the second locating feature 106 may be installed on the monocular housing 30. In the exemplary embodiment, installation of the objective assembly 12 places the second locating feature 106 in physical contact with the ring 102. Coupling the ring 102 and the second locating feature 106 in this manner draws the optical center of the image intensifier into a desired alignment with the objective assembly 12.

Figure 4:
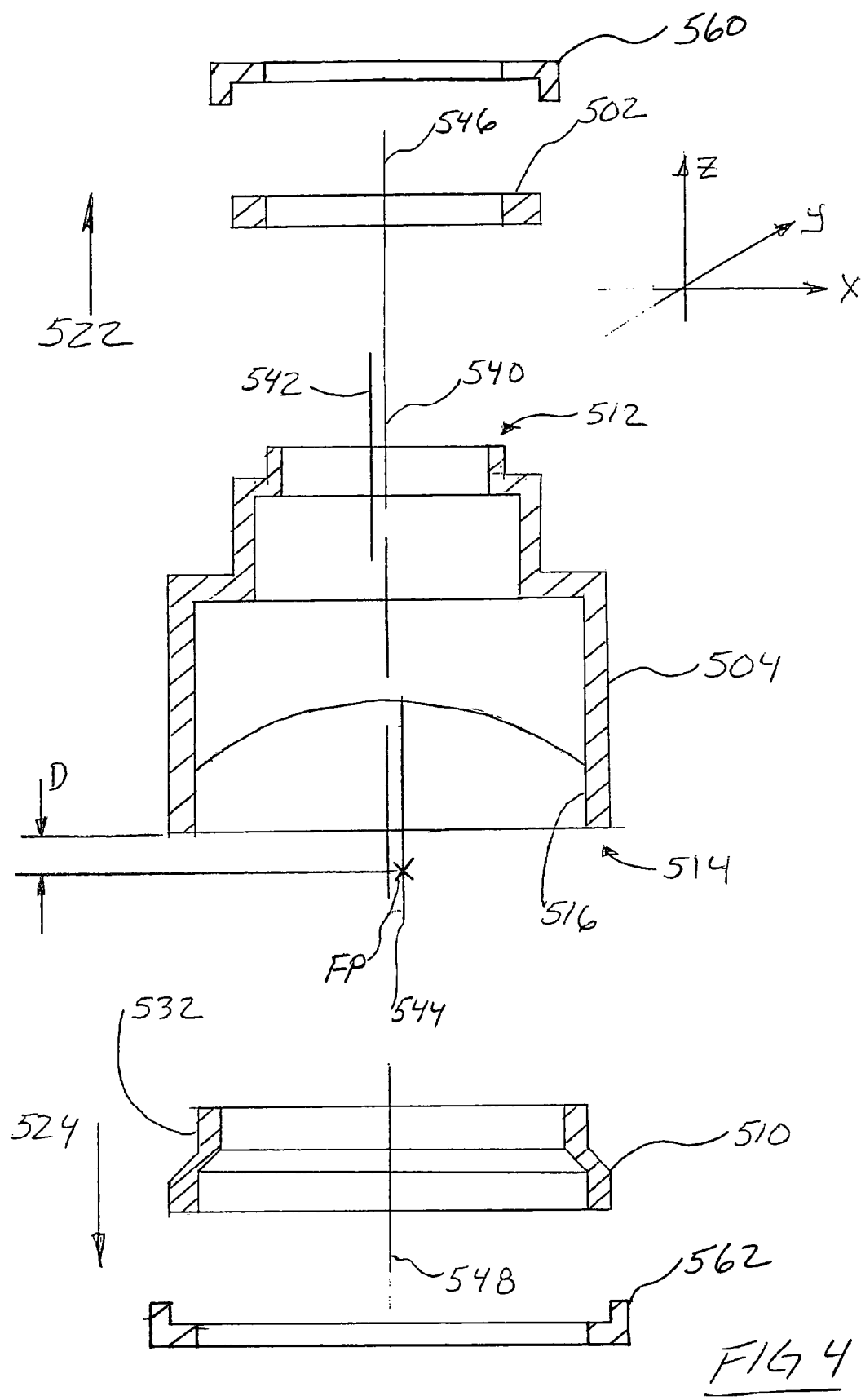
FIG. 4 is a section view of an image intensifier tube assembly consistent with one embodiment of the invention.

FIG. 4 is an exploded section view of an image intensifier tube assembly consistent with one embodiment of the invention. The image intensifier tube assembly may have a first locating feature 502 disposed adjacent a distal end 512 of an image intensifier tube 504 and a second locating feature 510 disposed adjacent a proximal end 514 of the image intensifier tube 504. Due to manufacturing tolerances, the image intensifier 504 may have a mechanical center 540 that is offset from an input optical axis 542 and an output optical axis 544. Light from an object enters through an objective lens 522 and travels through the first locating feature 502 along a mechanical axis 546 and then enters the distal end 512 of the image intensifier tube 504. The first locating feature 502 may be coupled to the distal end 512 of the image intensifier 504 to align the mechanical axis 546 of the first locating feature 502 with the input optical axis 542 of the image intensifier tube 504. The first locating feature 502 and the image intensifier tube 504 may be coupled together either directly or indirectly with hardware or an adhesive, for example 3M adhesive, type 2216. The first locating feature 502 may be sized relative to the distal end 512 to allow movement in the X and Y plane.

Light traveling through the image intensifier tube 504 may enter along the input optical axis 542 and exit along the output optical axis 544. Due to manufacturing tolerances of the image intensifier tube 504, the location of a focal plane FP of an output image may be located in a variety of locations along the output optical axis 544. The distance D from the proximal end 514 to the focal plane FP may vary enough to cause reduced system performance.

The second locating feature 510 may be sized relative to the proximal end 514 to allow movement in the X and Y plane and along the Z-axis. The second locating feature 510 may be coupled to the proximal end 514 of the image intensifier tube 504 to align a mechanical axis 548 of the second locating feature 510 with the output optical axis 544 of the image intensifier tube 504 (movement in the X-Y plane) and locate the focal plane FP at a predetermined distance from a feature, for example the proximal end of the second locating feature 510 (movement in the Z axis). The second locating feature 510 and the image intensifier tube 504 may be coupled together either directly or indirectly with hardware or an adhesive, for example 3M adhesive, type 2216. Outside surface 532 of the second locating feature 510 may be coupled to interior surface 516 of the image intensifier tube 504. The first locating feature 502 may cooperate with a third locating feature 560 to provide optical alignment and the second locating feature 510 may cooperate with a fourth locating feature 562 to provide optical alignment.

Figure 5:
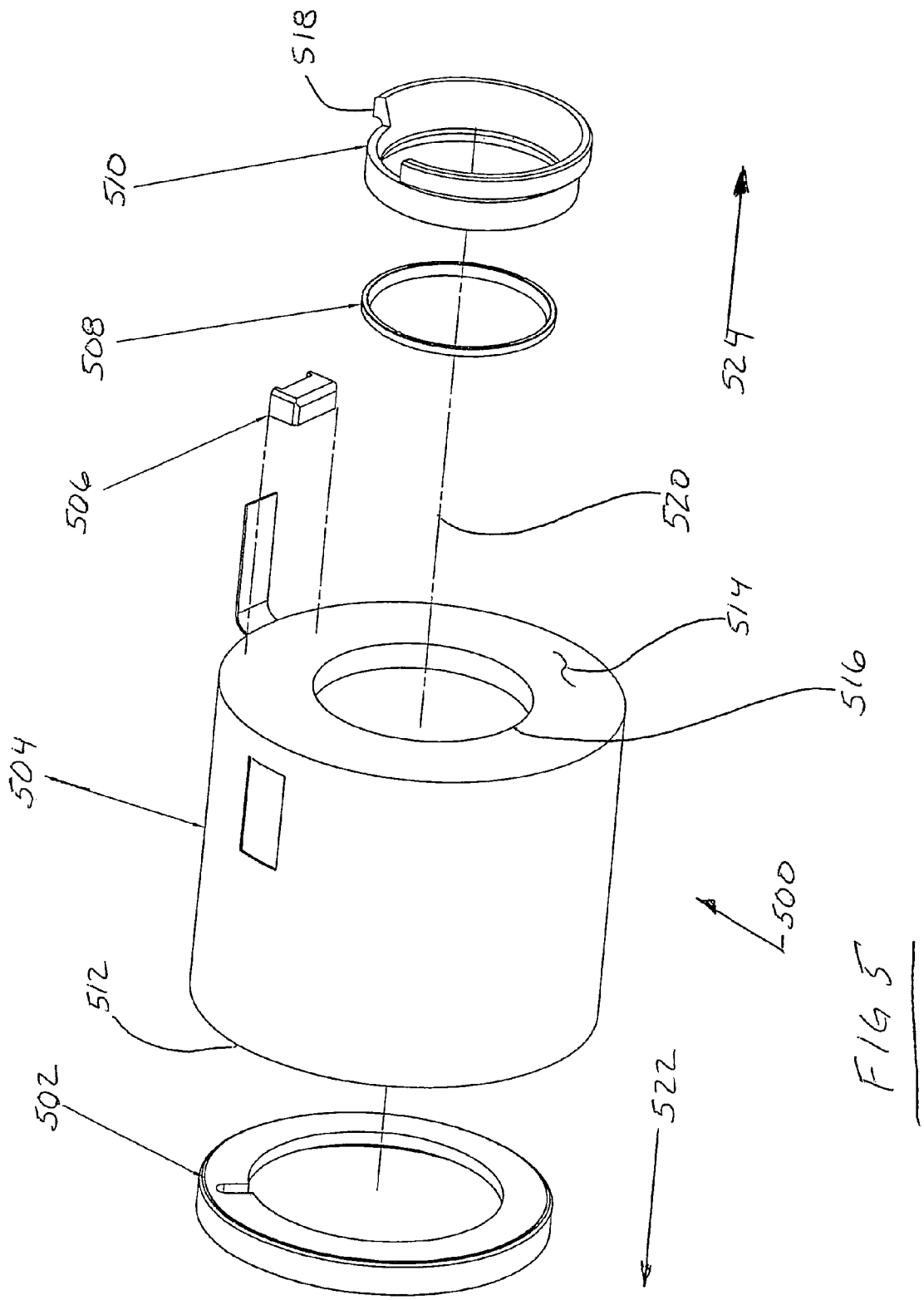
FIG. 5 is an exploded isometric view of an image intensifier assembly consistent with one embodiment of the present invention.

FIG. 5 is an exploded isometric view of an image intensifier assembly consistent with one embodiment of the present invention. An eyepiece glare stop baffle 508 may be located between the image intensifier tube 504 and the second locating feature 510. The second locating feature 510 may have a section 518 removed to allow a light pipe to be placed in the optical path of the eyepiece.

Figure 6:
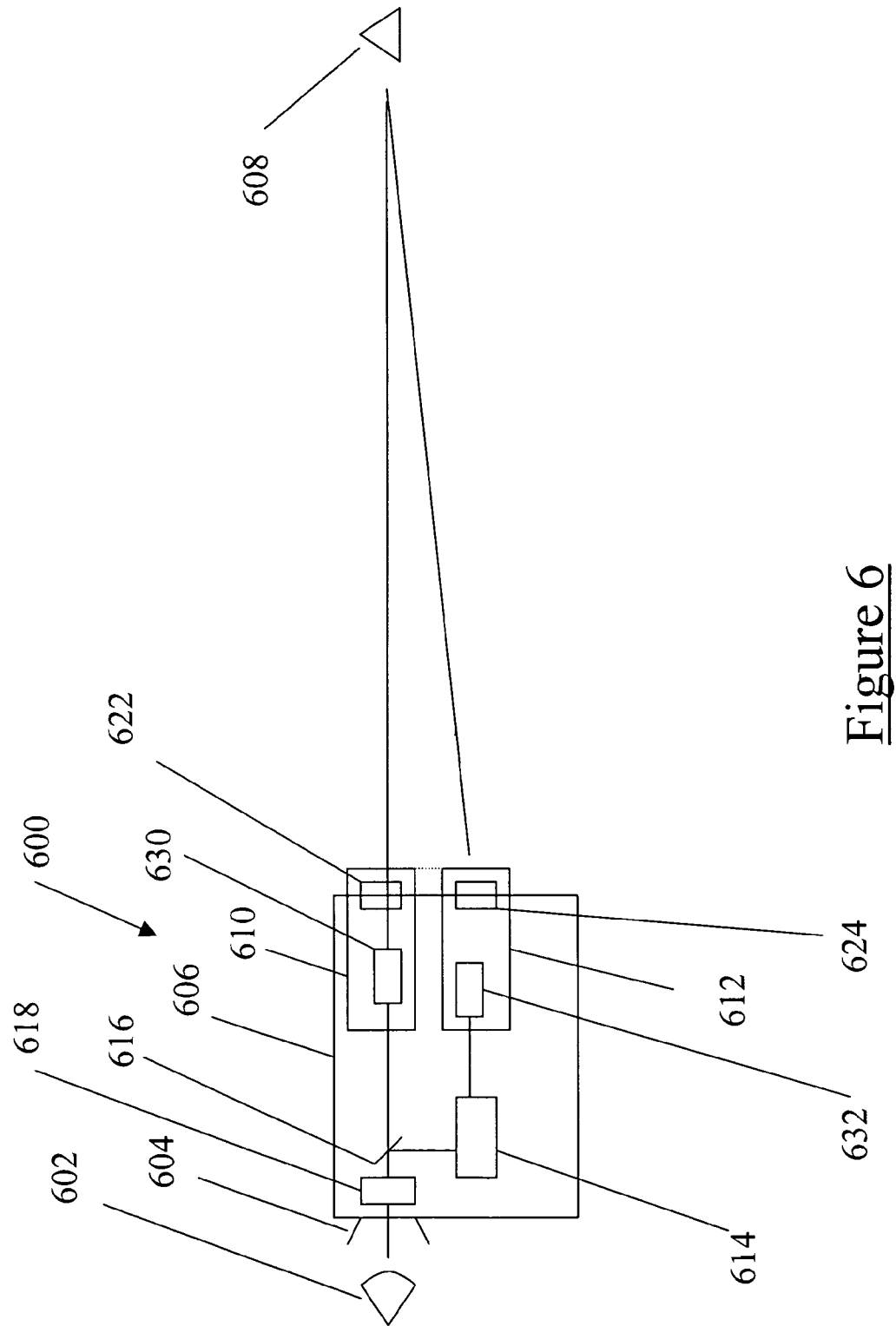
FIG. 6 is an illustration of a fused night vision system consistent with one embodiment of the present invention.

FIG. 6 is an illustration of a fused night vision system 600 consistent with one embodiment of the present invention. An operator 602 looking through an eyecup 604 secured to a housing 606 is able to see a target 608. Enclosed at least partially within the housing 606 may be a first channel 610 and a second channel 612, a display 614, an image combiner 616, and an eyepiece 618. The eyepiece 618 may have one or more ocular lenses for magnifying and focusing the combined image of the target 608. The first channel 610 may be an image intensification channel having an $I^2$ assembly 630 and an objective focus 622 and the second channel 612 may be a thermal channel having a focal plane array 632 and an objective focus 624. The $I^2$ assembly 630 may have an $I^2$ tube with a first locating feature and a second locating feature to allow replacement of the $I^2$ tube assembly 630 without realignment as noted above. The output of the focal plane array 632 may be displayed in the display 614. The output from the display 614 and the output from the $I^2$ tube 630 may be combined in the image combiner 616 for viewing by the operator 602. Alternatively, the image intensified image and the thermal image may be electronically fused together for viewing by the operator.

According to yet another aspect of the invention, there is provided a night vision system including an image intensifier tube, a first locating feature coupled to a distal end of the image intensifier tube in alignment with an input optical axis of the image intensifier tube, and a second locating feature coupled to a proximal end of the image intensifier tube in alignment with an output optical axis of the image intensifier tube and in a predetermined location along the output optical axis of the intensifier tube.

According to yet another aspect of the invention, there is provided an image intensifier tube assembly including an image intensifier tube, a first means for aligning an input optical axis of the image intensifier tube with a first optical component and a second means for aligning an output optical axis of the image intensifier tube with a second optical component in a predetermined location along the output optical axis of the intensifier tube.

According to another aspect of the invention, there is provided a method of aligning an image intensifier tube in a channel of a night vision system including aligning a first locating feature with an input optical axis of a image intensifier tube and then coupling the first locating feature to the image intensifier tube and aligning a second locating feature with an output optical axis of the image intensifier tube and in a predetermined location along the output optical axis of the image intensifier tube and coupling the second locating feature to the image intensifier tube.

According to a further aspect of the invention, there is provided a night vision system including an image intensifier tube, a first locating feature coupled to a distal end of the image intensifier tube in alignment with an input optical axis of the image intensifier tube, and a second locating feature coupled to a proximal end of the image intensifier tube in alignment with an output optical axis of the image intensifier tube and in a predetermined location along the output optical axis of the intensifier tube. The first and second locating features adapted to interact with a third and a fourth locating feature respectively whereby the input optical axis of the image intensifier tube is aligned with a first optical component and the output optical axis and focus plane of the image intensifier tube is aligned with a second optical component.

According to yet another aspect of the invention, there is provided a fusion night vision system including a thermal sensor, a display, and an image intensifier tube. The image intensifier tube includes a first locating ring disposed on a distal face of the image intensifier tube and a second locating ring disposed on a proximal face, the locating rings being aligned with respective input and output optical axes of the image intensifier tube. The system further includes an objective assembly including a third locating member adapted to mate with the first locating ring to align the input optical axis with an optical axis of the objective assembly and an ocular assembly including a fourth locating member adapted to mate with the second locating ring to align the output optical axis with an optical axis of the ocular assembly and form an image at a predetermined location along the output optical axis of the intensifier tube.

It should be understood by those having skill in the art that the description herein above is susceptible to modification and variation without departing from the scope of the invention. The description of the exemplary embodiments should, therefore, not be construed as limiting the scope of the invention as set forth by the appended claims.

What is claimed is:

1. A night vision system, comprising:
   an image intensifier tube having a longitudinal length defining a Z-axis of a rectangular coordinate system; and
   a first, a second, a third and a fourth locating feature, said first and said second locating features configured to be coupled to a distal and a proximal end of the image intensifier tube, respectively;
   wherein said first locating feature is further configured to interact with said third locating feature, said first locating feature also configured to provide movement of said image intensifier tube in X and Y axes to align an input optical axis of the image intensifier tube with a mechanical axis of said first locating feature; and
   wherein said second locating feature is further configured to interact with said fourth locating feature, said second locating feature also configured to provide movement of said image intensifier tube relative to said second locating feature in X, Y, and Z-axes to align a mechanical axis of said second locating feature with said output optical axis of said image intensifier tube and to locate a focal plane of the image intensifier tube at a predetermined distance from a proximal end of said second locating feature.

2. The night vision system of claim 1, wherein the first locating feature is directly coupled to the image intensifier tube.

3. The night vision system of claim 1, wherein the second locating feature is directly coupled to the image intensifier tube.

4. The night vision system of claim 1, wherein the first locating feature comprises a ring configured to be disposed on a distal face of the image intensifier tube.

5. The night vision system of claim 1, wherein said first and said third locating features are configured to align said input optical axis of said image intensifier tube with an objective assembly and wherein said second and said fourth locating features are configured to align said output optical axis of said image intensifier tube with an ocular assembly.

6. The night vision system of claim 2, wherein said first locating feature is adhesively coupled to the image intensifier tube.

7. The night vision system of claim 3, wherein said second locating feature is adhesively coupled to the image intensifier tube.

8. The night vision system of claim 1, wherein the second locating feature comprises a ring disposed on a proximal face of the image intensifier tube.

9. The night vision system of claim 1, wherein said first and said third locating features are configured to align said input optical axis of said image intensifier tube with an objective assembly and wherein said second and said fourth locating features are configured to align said output optical axis of said image intensifier tube with an eyepiece assembly.

10. The night vision system of claim 1, wherein said third locating feature is directly coupled to said first optical component of said night vision system.

* * * * *